Nov. 14, 1944.  G. E. DURGIN  2,362,808
PLUG GAUGE
Filed May 19, 1943
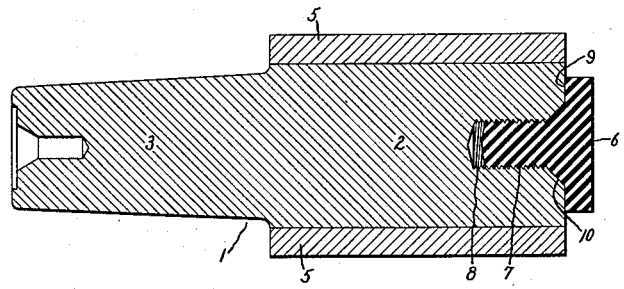
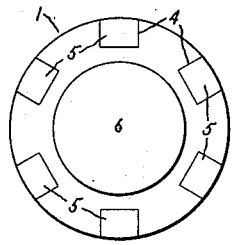
Inventor:
George E. Durgin,
by Harry E. Dunham
His Attorney.

Patented Nov. 14, 1944

2,362,808

UNITED STATES PATENT OFFICE 2,362,808

PLUG GAUGE

George E. Durgin, South Lynnfield, Mass., assignor to General Electric Company, a corporation of New York Application May 19, 1943, Serial No. 487,604

3 Claims. (Cl. 33—178)

The present invention is a plug gauge and more particularly a plug gauge which employs hard metal inserts on the surface thereof. Prior to the present invention it has been customary to employ plug gauges which consist of a steel body portion provided with suitable wear-resistant inserts, for example inserts of hard metal such as cemented carbide which is a well known sintered product consisting of one or more hard metal carbides bonded with lower melting point metal such as cobalt. It frequently happens that such gauges become lodged so securely in the opening being measured that they cannot be removed therefrom other than by means of a hammer blow. Such blows cause an outward motion of the relatively soft metal comprising the body portion of the gauge while repeated blows render the gauge oversize and so inaccurate as to be useless.

It is one of the objects of the present invention to provide a plug gauge which can be removed from the work without injury to the gauge.

The novel features which are characteristic of my invention are set forth with particularity in the appended claims. The invention itself, however, will best be understood from reference to the following specification when considered in connection with the accompanying drawing in which Fig. 1 is a sectional view of a plug gauge embodying the features of my invention while Fig. 2 is an end view of that gauge.

Referring more particularly to the drawing, I have indicated at 1 a plug gauge consisting of a steel main body portion 2 and a reduced handle portion 3. The surface of the main body portion is provided with circumferentially arranged uniformly spaced grooves or channels 4 which extend along the entire length of the main body portion. Cemented carbide inserts 5 are accurately fitted in the grooves 4 and brazed therein to provide a wear-resistant surface on the gauge.

In order to permit easy removal of the gauge from a measured opening and without injury to the gauge I provide a plug 6 which may be made of soft metal such as copper or brass or of non-metallic material, for example compressed fabric or the like such as Textolite, a material commonly employed in the fabrication of gears. The plug 6 is provided with a screw threaded portion 7 which is adapted to engage in a similar screw threaded opening in the main body portion 8 of the plug. The outer end of the plug 6 is provided with an enlarged head or shoulder portion 9 which is in contact with the end surface of the main body portion of the gauge. The outer end of the screw threaded portion 7 is chamfered as indicated at 10 to permit its use as a center in future repair work.

In removing the gauge from any opening, hammer blows may be applied to the shoulder portion 9 of the plug 6 without causing any variation in the diameter of the gauge.

While I have illustrated my invention in connection with a round gauge it is obvious that it may be employed equally well with flat or other types of gauges.

What I claim as new and desire to secure by Letters Patent of the United States, is:

1. In a plug gauge consisting of a main body portion and hard wear-resistant inserts on the surface thereof, the outer end of said body portion having an opening therein and a plug member of softer material than said body portion secured in said opening, said member being provided with a shoulder portion engaging and extending beyond the outer end surface of said gauge.

2. A plug gauge consisting of a main body portion, hard wear-resistant inserts on the surface thereof and a detachable member of relatively soft material secured to the outer end of said gauge, said member being secured in an opening in the end surface of said main body portion, said opening being chamfered to permit its use as a center.

3. A plug gauge consisting of a main body portion, a plurality of hard, wear-resistant inserts on the work-engaging surface thereof and a detachable plug of relatively soft material secured to the outer end of said gauge, said plug being secured in an opening in the end surface of said main body portion, said opening being chamfered to permit its use as a center, said plug being provided with an enlarged head portion engaging said chamfered portion of said opening and the outer end surface of said gauge.

GEORGE E. DURGIN.